April 27, 1965     E. S. TUPPER     3,180,541
PITCHER AND COVER
Original Filed Jan. 4, 1960
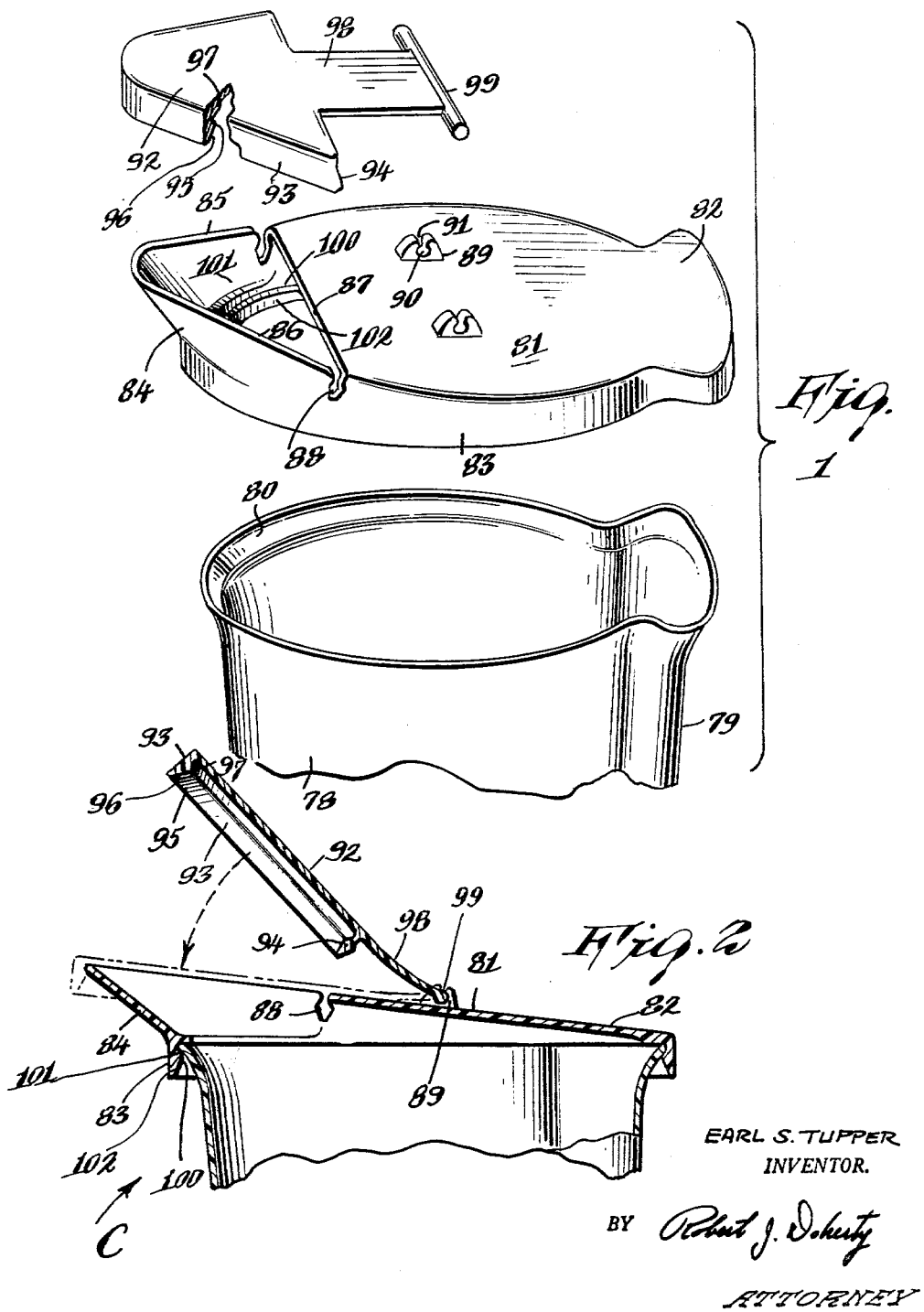
EARL S. TUPPER
INVENTOR.
BY *Robert J. Doherty*
ATTORNEY United States Patent Office 3,180,541
Patented Apr. 27, 1965

3,180,541
PITCHER AND COVER
Earl S. Tupper, Esmond, R.I., assignor to Rexall Drug and Chemical Company, Los Angeles, Calif., a corporation of Delaware
Original application Jan. 4, 1960, Ser. No. 297, now Patent No. 3,081,010, dated Mar. 12, 1963. Divided and this application May 16, 1962, Ser. No. 205,142
3 Claims. (Cl. 222—545)

This application is a division of Tupper application Serial Number 297 filed January 4, 1960, now Patent No. 3,081,010.

This invention relates generally to covered hollow vessels including pitchers and canisters provided with independently sealable pouring spout elements; but more specifically to a type of vessel wherein the frictional and sealing joint formed by and between the several members is rigid owing to at least one of the joint cooperating members being formed of a high density olefinic polymer or copolymer.

Such polymers as high density polyethylene and high density polypropylene, at least after a molding operation, afford (1) internal properties of substantial rigidity and (2) surface properties of resilient deformability. Consequently, joints and couplings including such materials afford gasketing effects as has heretofore been disclosed in applicant's invention covered by U.S. Patent No. 2,859,786 and dated November 11, 1958.

An object of the present invention, therefore, is to improve the structure of covered vessels, pitchers and canisters having independently sealable pouring spout elements for efficient, sturdy, safe and durable operation in the disposal, storage and transportation of fluid and comminuted contents of low and high weight loads in household and domestic, industrial, commercial and other fields.

Another object of the invention resides in cover structure in cooperation with the complementary vessel, pitcher or canister structure of all regular and irregular shapes which is effective to afford a rigid, substantially sealtight and strong joint therewith and wherein said cover structure further affords a spout function in association with the vessel.

This application is a continuation-in-part of U.S. Patents Nos. 2,950,047; 2,842,167 and 2,859,786; and an improvement over applicant's invention covered in: U.S. Patent No. 2,487,400 dated November 8, 1949; U.S. Patent No. 2,610,490 dated September 16, 1952; U.S. Patent No. 2,764,199 dated September 25, 1956; U.S. Patent No. 2,789,608 dated April 23, 1957; U.S. Patent No. 2,842,167 dated July 8, 1958.

Although pitchers, canisters, covers and spout elements for storage and dispensing purposes have been and are in present use, drawbacks have been recognized such as loose connections owing to failure of frictional fits, difficult removability or separation of parts, exposure of vessel contents to surrounding atmospheric conditions, inadequate spout closures, decomposition of residual vessel content portions remaining in exposed areas after dispensing and contamination between the vessel contents and the vessel parts, and difficulty in cleaning the cover and spout elements.

Such drawbacks are not only overcome by the instant invention but other objects and advantages of the invention will hereinafter appear in the progress of the disclosure and as pointed out in the appended claims.

Accompanying this specification are drawings showing several forms of the invention wherein;

FIGURE 1 is an exploded view in perspective of the invention wherein the vessel is in the form of a canister, wherein the cover member is provided with an opening and a spout element; and wherein the spout closure member is attachable to the cover member; and FIGURE 2 is a sectional view of the parts shown in FIGURE 1 assembled but with the spout closure in open position.

The invention, generally designated C, is shown in FIGURES 1 and 2 and illustrates a vessel 78, a hollow handle 79 continuous therewith and a continuous or peripheral flared upper rim 80.

The vessel 78 is not provided with a spout, the spout being afforded only by a vessel cover. Thus, the cover has a top wall 81, a top wall extension 82 for the hollow handle mount and a peripheral vessel engaging skirt 83. Forwardly of the vessel engaging skirt 83 and opposite extension 82 is an upper and flared spout wall extension 84 having continuous top side free edges 85 and 86 and a rear edge 87. As shown, the open mouth of the spout is formed from a forward sectional cut-out of cover top wall 81, the latter sloping upwardly from the "heel" or handle covering part 82 and thereby effecting variation in the height of skirt 83.

A closure or cover member for the spout mouth is provided and as shown is of the hinged type for engagement with spaced lugs 90 of cover top wall 81 and having pintle openings 90 and an entry notch 91 for a pintle of the spout closure.

The spout closure has a top wall 92, a skirt 93 for engagement with the side flared edges 84 of the spout mouth and a rear skirt 94 of keyed section. Adjacent the junctions of spout mouth open edges 85-86 and 87 and on cover skirt 83 are downwardly extending and similarly key-shaped notch sockets 88 for frictionally and tightly engaging the end portions of closure rear skirt 94.

The inner face of skirt 93 as shown is formed with an intermediate rim 95 and oppositely sloped walls 96 and 97 for snap, live and tight engagement with the flared spout wall 84, the open rear edge 87 being in tight, flush and abutting engagement with rear skirt 94.

The closure has a rear tongue 98 for hinged connection to lugs 89 by means of tongue pintle 99 removably engageable with the lug openings 90.

The main cover skirt 83 is adapted to frictionally and sealably engage vessel 78 by snap engagement as heretofore described in the other embodiments. Thus, the inner face of skirt 83 peripherally and in parallelism with the lower edge is provided with an intermediate rim 100 and oppositely sloped walls 101 and 102.

The vessel, cover and spout closure parts above described may be molded by standard resin-molding techniques. However, when a substantially rigid part is formed of metal, glass, composition or other non-resinous material, the other complementary and engageable part is formed of resinous material as mentioned to effectuate a live, seal-tight, frictional and disengageable joint.

Furthermore, each of said parts is constructed and shaped for easy assemblage and disassemblage with the other parts, for easy accessibility to cleaning and washing, for natural draining or shedding of clinging or residual vessel contents after each use of the device, and for elimination of dirt and vessel content collecting traps.

Additionally, the cover member being engageable with the vessel at a rigid, strong and pressure-resistant joint, same serves as an ice-guard for chilled fluid contents when pouring is effected through the spout of the device.

It is understood that minor changes and modifications in the material, location, integration, shape, size of parts and all types of molding including injection, compression and vacuum may all be resorted to without departing from the spirit of the invention and the scope of the appended claims.

I claim:

1. A cover and closure combination for use on a container having bottom and side walls and a top opening, the top of the side walls having outward extensions forming a peripheral rim at said opening; said cover overlying said top opening and having a dispensing opening; a downwardly directed flange integral with the underside of the cover; said flange resiliently and tightly engaging said rim to releasably unite the cover and container; said dispensing opening being defined by vertically disposed peripheral walls forming part of said cover; a pair of vertically extending slots in said walls; a closure mount for swinging movement about a pivot point on said cover, said closure overlying the dispensing opening when the closure is in closed position; said slots being spaced from each other and one slot being located on each side of said pivot point; a downwardly directed flange integral with the underside of said closure, said flange being constructed and arranged to be received within said dispensing opening between said slots and in the area closest to said pivot point, and to be received within each of said slots, and engageable with the outside of said peripheral walls around the remainder of the dispensing opening; said closure flange resiliently and tightly engaging the peripheral walls of the dispensing opening to seal the contents of said container.

2. A cover and closure combination according to claim 1 wherein portions of said slots are undercut to provide an enlarged opening below a narrower entrance slot, and said closure flange has an enlarged rib adapted to be snapped into said undercut to maintain the closure in closed position.

3. A cover and closure combination according to claim 1 wherein the cover portion defining the dispensing between said slots is substantially straight, and the portion of the closure flange received within the dispensing opening is substantially straight and engageable with said straight cover portion.

References Cited by the Examiner

UNITED STATES PATENTS 2,764,199  9/56  Tupper.
2,832,517  4/58  Baumgartner _____ 222—545
2,886,218  5/59  Marcus _____ 222—556 X LOUIS J. DEMBO, *Primary Examiner.*